US011526499B2

(12) United States Patent
Tock et al.

(10) Patent No.: US 11,526,499 B2
(45) Date of Patent: Dec. 13, 2022

(54) ADAPTIVELY UPDATING DATABASES OF PUBLISH AND SUBSCRIBE SYSTEMS USING OPTIMISTIC UPDATES

(71) Applicant: International Business Machines Corporation, Armonk, NY (US)

(72) Inventors: Yoav Tock, Haifa (IL); Nir Naaman, Haifa (IL); Avraham Harpaz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 16/278,186

(22) Filed: Feb. 18, 2019

(65) Prior Publication Data

US 2020/0265039 A1    Aug. 20, 2020

(51) Int. Cl.
   *G06F 16/23* (2019.01)
(52) U.S. Cl.
   CPC ...... *G06F 16/2386* (2019.01); *G06F 16/2322* (2019.01)
(58) Field of Classification Search
   CPC ....... H04L 67/26; H04L 41/16; H04L 67/143; H04L 67/146; H04L 67/42; G06F 16/953
   USPC ........................................................ 707/694
   See application file for complete search history.

(56) References Cited

U.S. PATENT DOCUMENTS

| | | | |
|---|---|---|---|
| 8,706,865 B1 | 4/2014 | L'Heureux et al. | |
| 8,787,393 B2 | 7/2014 | Jakubik et al. | |
| 8,874,667 B2 | 10/2014 | Edwards et al. | |
| 9,269,080 B2 | 2/2016 | Miller et al. | |
| 9,465,880 B2 | 10/2016 | Gray-Donald et al. | |
| 9,491,134 B2 | 11/2016 | Rosen et al. | |
| 9,552,493 B2 | 1/2017 | Uzun et al. | |
| 9,584,449 B2 | 2/2017 | Fletcher et al. | |
| 9,654,571 B2 | 5/2017 | Horton | |
| 9,912,676 B1 | 3/2018 | Fieldman | |
| 9,912,695 B1 | 3/2018 | Chao et al. | |
| 9,996,561 B1 * | 6/2018 | Barsness | G06F 16/21 |
| 10,021,245 B1 | 7/2018 | Koster et al. | |
| 10,691,501 B1 * | 6/2020 | Hussain | G06F 9/485 |
| 2003/0163693 A1 | 8/2003 | Medvinsky | |
| 2005/0246186 A1 | 11/2005 | Nikolov | |
| 2006/0080287 A1 * | 4/2006 | Majd | G06F 16/24539 |
| 2006/0224744 A1 * | 10/2006 | Rao | H04L 67/1008 709/227 |
| 2006/0248038 A1 * | 11/2006 | Kaplan | G06F 16/164 |
| 2007/0192326 A1 * | 8/2007 | Angal | G06F 11/1482 |

(Continued)

OTHER PUBLICATIONS

Amozarrain, Ugaitz et al., Reliable Publish/Subscribe in Dynamic Systems, Mar. 15, 2016, pp. 10.

(Continued)

*Primary Examiner* — Usmaan Saeed
*Assistant Examiner* — Earl Levi Elias
(74) *Attorney, Agent, or Firm* — Barry D. Blount

(57) ABSTRACT

An example system includes a processor to receive updates for a database of a publish and subscribe system. The processor is to generate an optimistic update based on the received updates. The processor is also to adaptively update the database using the optimistic update. In some examples, the processor generates a bulk optimistic update based on the optimistic update and adaptively updates the database using the bulk optimistic update or a read-modify-write sequence.

21 Claims, 8 Drawing Sheets

(56) References Cited

U.S. PATENT DOCUMENTS

| | | |
|---|---|---|
| 2007/0276943 A1 | 11/2007 | Marez et al. |
| 2008/0133454 A1* | 6/2008 | Markl ............... G06F 16/24539 |
| 2009/0125420 A1* | 5/2009 | Zhang ................ G06Q 30/0601 |
| | | 705/26.1 |
| 2009/0171705 A1 | 7/2009 | Bobak et al. |
| 2009/0319498 A1* | 12/2009 | Zabokritski ......... G06F 16/2452 |
| 2010/0070639 A1 | 3/2010 | Hoggan |
| 2010/0333111 A1 | 12/2010 | Kothamasu et al. |
| 2012/0023558 A1 | 1/2012 | Rafiq |
| 2013/0013688 A1 | 1/2013 | Wang et al. |
| 2013/0262931 A1 | 10/2013 | Siddalingesh |
| 2015/0207857 A1 | 7/2015 | Horton |
| 2015/0280959 A1 | 10/2015 | Vincent |
| 2015/0296242 A1 | 10/2015 | Khalil et al. |
| 2016/0019279 A1* | 1/2016 | Sengupta ............. G06F 16/275 |
| | | 707/625 |
| 2016/0173423 A1 | 6/2016 | Cullen |
| 2016/0227471 A1 | 8/2016 | De Foy et al. |
| 2017/0118218 A1 | 4/2017 | Koottayi et al. |
| 2017/0155691 A1 | 6/2017 | Knauft et al. |
| 2017/0331791 A1 | 11/2017 | Wardell et al. |
| 2018/0027006 A1 | 1/2018 | Zimmermann et al. |
| 2018/0083835 A1 | 3/2018 | Cole et al. |
| 2018/0131516 A1 | 5/2018 | Meng |
| 2018/0191809 A1 | 7/2018 | Yi |
| 2018/0254892 A1 | 9/2018 | Egorov et al. |
| 2018/0321356 A1 | 11/2018 | Kulkarni et al. |
| 2019/0235910 A1* | 8/2019 | Valentine ............ G06F 9/45558 |
| 2019/0235919 A1* | 8/2019 | Barsness ................ G06F 16/25 |

OTHER PUBLICATIONS

Barazzutti, Raphael, et al., Elastic Scaling of a High-Throughput Content-Based Published/Subscribe Engine, The research leading to these results has received funding from the European Community's Seventh Framework Programme (FP7/2007-2013) under grant agreement No. 257843 (SRT-15 project), Year: 2014, pp. 10, Abstract only available.

Salvador, Zigor, et al., Phoenix: A Protocol for Seamless Client Mobility in Publish/Subscribe, 2012 IEEE 11th International Symposium on Network Computing and Application, Sep. 13, 2012, p. 1.

List of IBM Patents or Applications Treated as Related.

* cited by examiner

100

200

ADAPTIVELY UPDATING DATABASES OF PUBLISH AND SUBSCRIBE SYSTEMS USING OPTIMISTIC UPDATES

BACKGROUND

The present techniques relate to publish and subscribe systems. More specifically, the techniques relate to modifying databases of publish and subscribe systems.

SUMMARY

According to an embodiment described herein, a system can include processor to receive updates for a database of a publish and subscribe system. The processor can also further generate an optimistic update based on the received updates. The processor can also adaptively update the database using the optimistic update or a read-modify-write sequence.

According to another embodiment described herein, a method can include receiving, via a processor, updates for a database of a publish and subscribe system. The method can further include generating, via the processor, an optimistic update based on the received updates. The method can also further include adaptively updating, via the processor, the database using the optimistic update or a read-modify-write sequence.

According to another embodiment described herein, a computer program product for adaptively updating a publish and subscribe system database using bulk optimistic updates can include computer-readable storage medium having program code embodied therewith. The computer readable storage medium is not a transitory signal per se. The program code executable by a processor to cause the processor to receive updates for a database of a publish and subscribe system. The program code can also cause the processor to generate optimistic updates based on the received updates. The program code can also cause the processor to generate a bulk optimistic update based on the optimistic updates. The program code can also cause the processor to adaptively update the database using the bulk optimistic update or a read-modify-write sequence. The program code can also cause the processor to update the database using the bulk optimistic update in response to detecting that an optimistic update failure rate does not exceed a first threshold rate.

DETAILED DESCRIPTION

Figure 1:
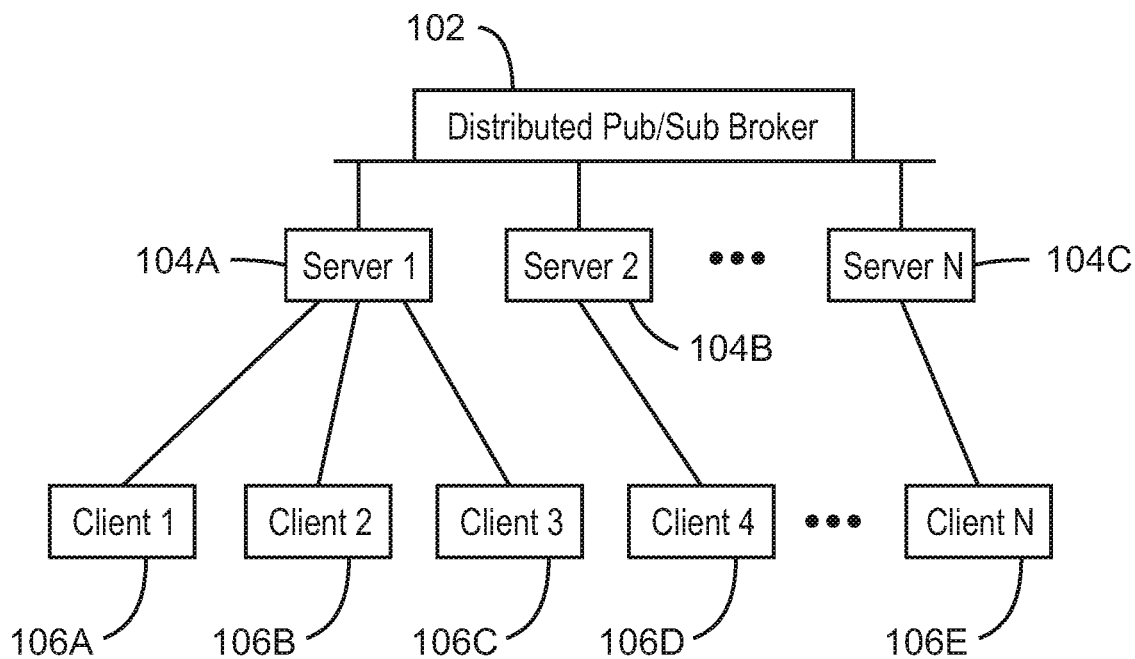
FIG. 1 is a block diagram of an example system for publishing and subscribing that can be adaptively updated using optimistic updates.

Publish and subscribe (pub/sub) systems are communication paradigms that allow users that produce and consume messages to interact in a decoupled fashion. One example of a pub/sub system is a topic-based pub/sub system. In a topic-based pub/sub system, message producers, referred to as publishers, publish their messages on logical channels called "topics". Message consumers, referred to as subscribers, subscribe to the topics that are of interest to them, and receive messages published on those topics of choice. Publishers and subscribers are thus decoupled because they do not need to know of one another, but rather the topic names with which they communicate. An example pub/sub architecture is that of a single centralized broker to which multiple clients connect. Each client can be a publisher, a subscriber, or both. The broker is responsible for routing the messages published by the publishers to the subscribers according to the pub/sub protocol the messaging system implements. However, a single centralized broker may not be sufficient to support large pub/sub messaging systems with many clients and high throughput.

Therefore, a group, or a cluster, of multiple servers may be used to collectively implement a distributed broker. As one example, when a client connects to a messaging server, the server updates the status of the client to "connected" in a shared database. When a client disconnects, the server updates the client's status in the shared database to "disconnected". However, several factors may cause inconsistencies in the database, including connection stealing, server failures, and timing races. An example method of dealing with inconsistencies in the database is to implement each update as a read-modify-write transaction on a versioned record. However, the rate of connectivity events may be faster than the rate in which the database executes read-modify-write operations. Moreover, the task of presenting one centralized broker to various clients may involve certain tradeoffs between how close the distributed broker resembles a single centralized broker and the performance, scalability, and complexity of the pub/sub implementation. In many cases, some of the requirements of the pub/sub protocol are relaxed in the implementation of the distributed pub/sub broker to achieve other goals such as scale, performance, or simplicity.

According to embodiments of the present disclosure, a processor of a server can adaptively update a database using optimistic updates. For example, a processor of a publish and subscribe system can receive updates for a database of a publish and subscribe system. The processor generates optimistic updates based on the received updates. As used herein, an optimistic update refers a technique that utilizes the ability to issue conditional updates to databases, in which some fields of a record are used as conditions. For example, an update is computed based on a previously read version, and updates to a first set of fields is predicated on another set of fields having a certain expected value. In some examples, the processor generates bulk optimistic updates based on the optimistic updates. The processor can adaptively update the database using the optimistic update. In some examples, the processor adaptively updates the database using the bulk optimistic updates or read-modify-write sequences. For example, the processor can adaptively update the database using individual read-modify-write transactions or bulk optimistic updates based on whether one or more threshold failure rates are exceeded or not exceeded. The embodiments of the present disclosure thus allow updates to a database of a distributed publish and subscribe system to be performed more efficiently. For example, the techniques described herein enable reduced processing time and power consumption. In addition, the techniques enable the rate in which the database executes read-modify-write operations to match or exceed the rate of connectivity events. Thus, the techniques described herein may prevent duplicate client IDs from being used.

In some scenarios, the techniques described herein may be implemented in a cloud computing environment. As discussed in more detail below in reference to at least FIGS. 5-8, a computing device configured to update a database using optimistic updates may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, a block diagram shows an example system for publishing and subscribing that can be adaptively updated using optimistic updates. The example system 100 includes a distributed publish and subscribe (pub/sub) broker 102. The distributed pub/sub broker 102 is communicatively coupled to a number of servers, including server 104A, server 104B, and server 104C. In various examples, the servers 104A-104C are computing devices that receive, store, and transmit data between the clients 106A-106E. As one example, the system 100 includes client 106A, client 106B, and client 106C communicatively coupled to server 104A. The system includes client 106D communicatively coupled to server 104B. The system also includes client 106E communicatively coupled to server 104C.

In the example of FIG. 1, a group, or a cluster, of multiple servers including servers 104A-104C collectively forms a distributed pub/sub broker 102. Clients 106A-106E can connect to one of the servers and thus the load on each server is reduced by distributing the workloads provided by the clients 106A-106E. Although three servers 104A-104C are shown in the example of FIG. 1, additional servers may be used. In some examples, by adding more servers, the capacity of the system 100, in terms of the number of clients that can connect and the overall message throughput, is increased. In various examples, the distributed pub/sub broker 102 appears to the clients 106A-106E as a single large centralized pub/sub broker to which all the clients 106A-106E are connected.

Still referring to FIG. 1, a distributed pub/sub broker 102 of system 100 is implemented by a set of decoupled servers 104A, 104B, 104C. To keep the implementation simple and scalable the servers 104A, 104B, 104C may have minimal direct interaction with one another and a new client connection is routed, by a load balancer, to one of the servers 104A, 104B, or 104C. For example, the new client connection may be routed to the least loaded server of the server 104A, 104B, or 104C. In some examples, any other load balancing scheme may be used to route new client connections.

One aspect of pub/sub messaging concerns the detection and possibly prevention of duplicate client sessions. In some examples, each client has a unique client identifier (ClientID) and the pub/sub broker 102 must not have more than one client connected with the same ClientID. For example, the Pub/sub system 100 may be used to implement the MQTT protocol. The MQTT specification, version 3.1 released on Aug. 19, 2010, states that if a client attempts to connect to the broker and another client is already connected with the same ClientID, the currently connected client is to be disconnected. Only after an old client is disconnected, the new client is connected. By disconnecting the old client, the system 100 is able to remove clients which become unresponsive and thus may not be easily disconnected. In various examples, different policies for handling duplicate client sessions may be used. The policies can define, for example, that both the old and new clients be disconnected, one client be disconnected (old or new), or that both clients will be allowed to connect. The preferred action may depend on several factors such as the type of the client or the recent history of duplicate client sessions. In some examples, the policy is for the new client to be allowed to connect, whereas the old client is immediately or eventually disconnected. Thus, as one example, if a client with ClientID X connects to the broker while another client with ClientID X is already connected to the broker, the pub/sub system 100 detects the duplication and proceeds according to a predefined duplicate-client-session policy. For example, to comply with the specifications of the MQTT protocol the client that connected first must be disconnected and only then the new client may connect. In another example, an administrator may set a policy that does not delay the connection of the new client for more than five seconds even at the risk of temporarily creating a duplicate client session. In various examples, the tracking of client connections can be performed using a central repository or database, as discussed with respect to FIG. 2 below.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional clients, servers, or distributed pub/sub brokers, etc.).

Figure 2:
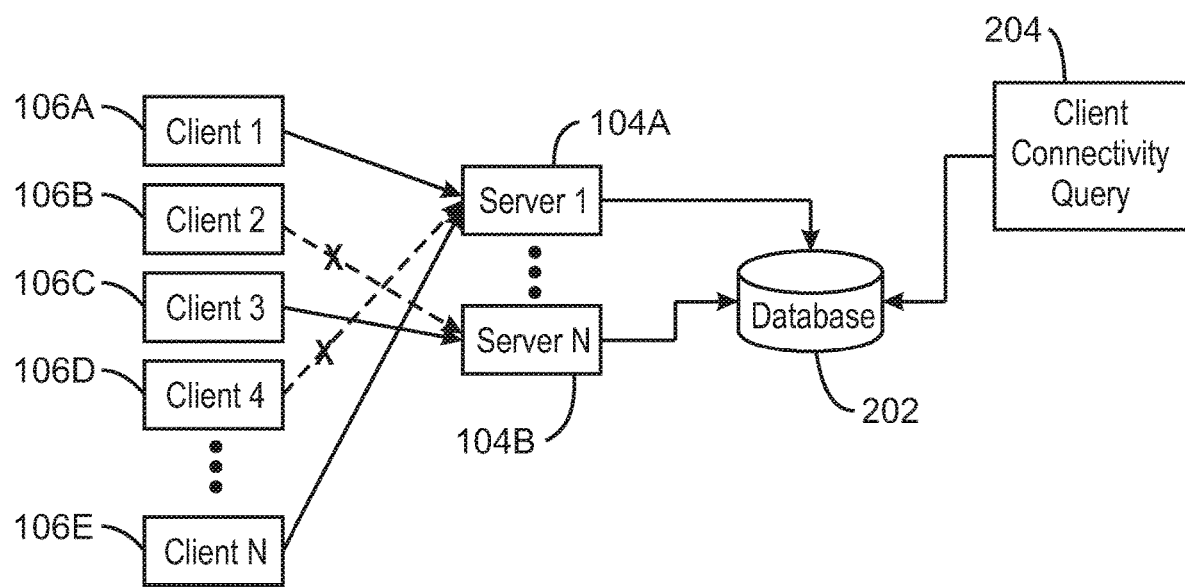
FIG. 2 is a block diagram of another example system for publishing and subscribing including a database adaptively updated using optimistic updates.

With reference now to FIG. 2, a block diagram shows another example system for publishing and subscribing including a database adaptively updated using optimistic updates. The example system 200 of FIG. 2 includes a set of clients 106A-106E. The system also includes servers 104A and 104B. The clients 106A and 106E are communicatively coupled to server 104A. The client 106C is communicatively coupled to server 104B. The client 106B was communicatively coupled to server 104B, but is now disconnected as indicated by dotted line and an X. Similarly, client 106D was communicatively coupled to server 104A, but is now disconnected as indicated by dotted line and an X. The system 100 further includes a database 202 communicatively coupled to server 104A and server 104B. The database 202 is shown receiving a client connectivity query 204.

In the example of FIG. 2, the connectivity of clients 106A-106E is tracked in the database 202. For example, the database 202 may be a central repository. Each server updates the repository whenever a client connects or disconnects. In various examples, the connectivity information may be used for multiple purposes such as monitoring clients, troubleshooting, sending messages to connected clients, or to clients with certain properties, among other purposes.

Still referring to FIG. 2, the central repository can be implemented using a database 202 such as MongoDB, MySQL, or any other suitable database 202. For example, the database 202 may be any database that supports the use of optimistic updates or bulk optimistic updates. In various examples, the servers 104A and 104B maintain tables or collections in the database. In some examples, the tables may include a SERVER_STATUS table used to track the status of the different servers 104A and 104B. For example, each row (or record/document) in the table has the following fields (columns): ServerID, StatusCode, and LastUpdate. The ServerID column may be used to store unique identifiers of each server. The StatusCode column may store the current status of each server. For example, the status of a server may be ACTIVE, SUSPENDED, or DOWN. In various examples, the tables may include a CLIENT_STATUS table. The CLIENT_STATUS table records the connectivity status of a client. As one example, each row in the CLIENT_STATUS table has the following fields: ClientID, ConnectStatus, ConnectingServer, and LastUpdate. The ClientID field may be used to store unique identifiers for each client. The ConnectStatus field may be used to store the current status of each client. For example, the status of each client may be CONNECTED or DISCONNECTED. The ConnectingServer field may be used to store the ServerID of the server to which each of the clients is currently connected. The LastUpdate field may be used to store a logical timestamp of the last update to this row.

In various examples, each of the servers 104A and 104B updates the CLIENT_STATUS table after a new client 106A-106E, such as clients 106A, 106C or 106E, is connected to the server or after an existing client disconnects from the server, such as in the case of clients 106B and 106D. In some examples, each such update includes the ClientID of the connecting or disconnecting client, the ServerID of the server as ConnectingServer, the ConnectStatus, and the current time as the LastUpdate field. Whenever a server updates one of the tables, the server ensures that the operations of reading from the database and writing to the database are atomic. This ensures that the server's view of the table is consistent with the actual table's content in the database at the time the update is performed. In various examples, this is done using conditional updates on the LastUpdate field. For example, a conditional update can include reading, modifying, and writing. In some examples, in reading, a server reads the row and records the LastUpdate field. In modifying, the server modifies the row-record in the server's memory based on the read content. The server then modifies the LastUpdate field to a newer timestamp. In writing, the server updates the row in the table, conditioned that the current LastUpdate field is equal to the one obtained in the read step. If the update fails, the sequence of read-modify-write is repeated. For example, the update may fail because the condition is not satisfied.

In various examples, the servers 104A and 104B use the SERVER_STATUS table in the database to detect which server is currently active and which server is down. For example, when a server is started, the server can generate a new unique ServerID for itself and update the SERVER_STATUS table with a new row including its ServerID, a StatusCode of ACTIVE and LastUpdate equal to the current time. While the server is active, the server periodically updates its LastUpdate timestamp. For example, the server may update the LastUpdate stamp every second. When a server is shut down, the server changes its StatusCode to DOWN before shutting down. In various examples, each server also periodically checks the LastUpdate timestamp of all other servers. In some examples, if a server detects a timestamp that was not updated in more than a configured timeout it changes the StatusCode of the corresponding server to SUSPENDED. For example, the configured timeout may be 20 seconds. The server then updates all the rows in the CLIENT_STATUS table in which the ConnectingServer is equal to the ServerID of the suspended server, to reflect the fact that the clients are disconnected. In some examples, if a server attempts to update its last update time and detects that its status code has changed to SUSPENDED, the server shuts itself down in response to detecting the suspended status code. Thus, the servers can detect when a server fails or becomes non-responsive and remove clients which were previously connected to this server. For example, the clients may have been disconnected when the server failed.

As one example, when client 106A with a ClientID of '1' connects through server 104A with a ServerID of 'X', the result of a client connectivity query 204 read response from the database may be: ClientID='1', ConnectStatus='DISCONNECTED', ConnectingServer='Z', LastUpdate=V. This indicates that the client 106A was previously connected and then disconnected from a server with ServerID='Z'. In some examples, the server 104A may change the record to the following, and write it to the database conditional on (LastUpdate==V): ClientID='1', ConnectStatus='CONNECTED', ConnectingServer='X', LastUpdate=V+1.

Therefore, in most cases, when client 106A disconnects from server 104A, the result of the read from the database may be: ClientID='1', ConnectStatus='CONNECTED', ConnectingServer='X', LastUpdate=V. The server 104A then changes the record to the following, and writes it to the database conditional on (LastUpdate==V): ClientID='1', ConnectStatus='DISCONNECTED', ConnectingServer='X', LastUpdate=V+1.

In various examples, connection stealing may result in two clients having the same ClientID. In the distributed setting, connection stealing is when a client 106A with a ClientID of 'A' connects through server 104A, while another client 106C with the same ClientID of 'A' is still connected through server 104B. In that case, reading the record would result in ClientID='A', ConnectStatus='CONNECTED', ConnectingServer='Y', LastUpdate=V. In some examples, the server 104A connecting the new client 106A allows the new client 106A to connect and conditionally updates the database (as in the normal case): ClientID='A', ConnectStatus='CONNECTED', ConnectingServer='X', LastUpdate=V+1. The server 104A then sends a message to server 104B to disconnect the old client 106C. When server 104B disconnects the old client 106C and performs the read in this case, server 104B will find the record above, and will be prevented from updating the database.

In various examples, if a server 104B with ServerID Y fails, then all the clients connected to server 104B (e.g. client 106B) are disconnected, but the status record in the database remains stale, showing the client 106B are in status 'CONNECTED', and still associated with server 'Y'. Thus, when the client 106B reconnects through another server 104B with ServerID 'X', the read result will show: ClientID='A', ConnectStatus='CONNECTED', ConnectingServer='Y', LastUpdate=V. This server failure case is indistinguishable from the connection-stealing case above from the point of view of the servers, and the server 104A behaves the same. If the server status monitoring mechanism discovers the failure, that will be reflected in the SERVER_STATUS table and eventually also in the CLIENT_STATUS table. However, updating all the clients in the CLIENT_STATUS table may take a long time.

In various examples, a server may perform an optimistic update. For example, in an average system, connection stealing and server failures may be rare. Therefore, in some examples, it is possible to perform the following optimization: if client with ClientID 'A' connects through server having ServerID 'X', then perform the following update:
SELECT:
   (ClientID='A') AND
     (ConnectStatus='DISCONNECTED') UPDATE:
   ConnectStatus='CONNECTED'
   ConnectingServer='X'
   LastUpdate=(LastUpdate+1)
where the availability of an increment operator on field LastUpdate is assumed. If the operation fails to select any record, then the read-modify-write flow described previously is executed.

In various examples, if a client with ClientID 'A' which is connected through server with ServerID 'X' performs a disconnect, then a server may execute the following update:
SELECT:
   (ClientID='A') AND
   (ConnectStatus='CONNECTED') AND
   (ConnectingServer='X')
UPDATE:
   ConnectStatus='DISCONNECTED'
   LastUpdate=(LastUpdate+1)
In this case, if the operation fails to select any record, the read-modify-write is not to be executed. This is true since if the operation fails because (ConnectStatus=='DISCONNECTED'), then ConnectStatus is already in the right status because it does not matter what the connecting server is. On the other hand, if the operation fails because (ConnectStatus=='CONNECTED') but (ConnectingServer≠'X'), then the response is to back-off. Nevertheless, it may sometime desirable to read the record after a disconnect update fails, for reporting and logging purposes. In some examples, these conditional writes are of the form: W={S,U}, where S is the selection criteria and U is a specification of the update.

In some examples, if in most cases these conditional updates succeed, the read-modify-write can be reduced to a conditional update only, referred to herein as an optimistic update. Neglecting the time it takes to modify in memory, the transaction time is changed from Trw=Tr+Tw to Ttx_opt=P*Tw+(1−P)*(Tw+Tr+Tw) if after a failed update for both connect and disconnect a read-write is executed. The transaction time is changed to Ttx_opt=P*Tw+(1−P)*(3*Tw+Tr)/2 if only after a failed update for connect a read-write is executed, where it is assumed that the probability for a connect is equal to the probability of a disconnect (Pconnect=Pdisconnect=0.5), P is the probability of optimistic update success, and Tr, Tw are the read & write times of a single record, respectively. Thus, the following equations may be used to calculate when this optimization improves average transaction time:

$$P > Tw/(Tr+Tw) \quad \text{Eq. 1A}$$

if a read is executed when disconnect fails, or $$P > (Tw-Tr)/(Tr+Tw) \quad \text{Eq. 1B}$$

if a read is not executed when disconnect fails, and Pconnect=Pdisconnect. In some examples, when P is close to 1, the server performs only updates, and save resources associated with most of the reads.

In various examples, a find-and-modify operation may be used for performing optimistic updates. In some examples, databases provide an operation called "find-and-modify", which looks up a certain record, modifies some fields in the record, and returns the record either before or after the modification. For example, one such database is MongoDB. In some examples, this find-and-modify operation can be used to maintain the client status in the following way. When client A connects through server X, server X may overwrite the existing record with:

SELECT:
   (ClientID='A')
UPDATE:
   ConnectStatus='CONNECTED'
   ConnectingServer='X'
   LastUpdate=(LastUpdate+1)

and return the old value. If (old.ConnectStatus=='CONNECTED' AND old.ConnectingServer≠'X'), then the server can report connection stealing and send a message to the old.ConnectingServer to disconnect the client A from that server. In some examples, when client A disconnects through server X, the processing is the same as in case of performing optimistic updates if only after a failed update for connect a read-write is executed. Thus, if Tfm < P*Tw+(1−P)*(3*Tw+Tr)/2, a server may use this method rather than optimistic updates. In some examples, if (Tfm>Tw), and P→1, then the server may use optimistic updates, where Tfm is the time it takes to perform a find and modify operation.

In various examples, the optimistic updates can be bundled into bulk optimistic updates to further improve efficiency. For example, in many databases it is possible to bundle writes into a bulk operation and send them to the database for execution. Using bulk operations saves a lot of the roundtrip time associated with a write request and it may particularly improve performance if the database is not co-located with the server on the same LAN. In some examples, a bulk includes of a series of conditional writes as described above: BULK={W1, W2, . . . WB}; where each update Wi={Si, Ui}, and the size of the bulk is B. In the optimistic case all the writes will succeed. However, sometimes one or more of the writes in the bulk may fail to select a record. For example, one or more of the writes may fail to select a record due to connection stealing or server failure.

Different databases may behave differently when one or more of the writes may fail to select a record. In some examples, a database indicates exactly which writes were performed and which writes where not performed. For example, the database may return an array of flags, one for each write in the bulk. In this case, the server may repeat the read-modify-write flow only for the "connects" out of the K failed writes Wj, j in FailedWriteSet. Thus, the average time to execute a bulk can be calculated using the equation:

$$Ttx\_bulk\_opt = \text{Sum}\_\{k=0:B\}(Pr[K=k]*(Twb+k(Tr+Tw)/2)) \quad \text{Eq. 2}$$

where Twb is the time to write a bulk, k is the number of writes that fail, and. Pr[K=k] is the probability of k failures in a bulk. This equation assumes that failed writes following a "disconnect" need not be repeated, and that the probability of a connect and a disconnect is equal to 0.5. Thus, when Ttx_bulk_opt<B*Trw, optimistic bulk updates improve overall performance. Thus $$E[Twb+k(Tr+Tw)/2]=Twb+E[k]*(Trw/2)<B*Trw$$

$$E[k]<2*(B*Trw-Twb)/Trw \quad \text{Eq. 3}$$

In some examples, a database may indicate only how many of the writes where performed. For example, the database may return a count of "matched" and "updated" records. In this case, the server may read each record Ri that contains a "connect", compare it to the desired state in Wi, and then modify and write only the records that failed to write in the bulk. For example, the server can read each record that contains a "connect" by selecting the primary key ClientID without the extra conditions. Thus, the average time to execute a bulk is given by the equation:

$$Ttx\_bulk\_opt=Pr[K=0]*Twb+\text{Sum}\_\{k=1:B\}(Pr[K=k]*(Twb+B*Tr/2+k*Tw/2)))=Twb+(1-Pr[k=0])*B*Tr/2+E[k]*Tw/2 \quad \text{Eq. 4}$$

Thus:

$$Ttx\_bulk\_opt<B*Trw(1-Pr[k=0])*B*(Tr1/Trw)+E[k]*(Tw1/Trw)<2*(B*Trw-Twb)/Trw \quad \text{Eq. 5}$$

In some examples, assuming that transactions fail independently, Equations (1), (3), (5) can be used to calculate a threshold failure rate above which it is no longer beneficial to use bulk optimistic updates. In both cases, if the single transaction failure rate Q=(1−P) is small enough, that is, the cause for optimism was true, using the bulk optimistic update technique improves performance significantly relative to non-bulk optimistic technique, and the non-bulk optimistic technique improves performance relative to the read-modify-write technique.

In various examples, an adaptive bulk optimistic update can be performed. As briefly mentioned before, there are two major sources that contribute to the failure of optimistic connectivity updates. The first source of optimistic connectivity update failure is connection stealing. Connection stealing happens when a second device connects with the same ClientID as a first device that is already connected. Unless a user that controls a lot of devices is coordinating such behavior (very unlikely), this process can be assumed to be causing independent identically distributed failures among different devices, with low probability of failures. The second source of optimistic connectivity update failure is server failure. For example, when a server fails, all the devices that were connected to the failed server are disconnected, but the database will still indicate that the disconnected devices are connected to that server. These disconnected devices may then try to reconnect through other servers, and when those servers process the reconnect events, the optimistic connectivity updates may fail. Thus, this is a process that will create a lot of correlated optimistic update failures, in the form of a burst of failures that may last for minutes, until all the clients reconnect. Another source of inconsistency may be when a client disconnects from server X and connects to server Y before server X updated the database with a disconnect status. This appears to server Y as a bogus connection stealing and is treated in the same way.

Therefore, the assumption that optimistic update transactions fail independently may be incorrect. The failure of optimistic update transactions may be a combination of two processes: connection stealing that create rare independent identically distributed optimistic update failures, and server failures that may each create a long burst of failures. Under the first case, a server may continue with bulk optimistic updates, whereas in the second case, the server can switch to read-modify-write of individual connectivity events until the mass reconnect of devices subsides. In some examples, a mechanism can be used to decide whether to use bulk optimistic transactions (BOT), or single transaction Read-Modify-Write (1TX-RMW). This mechanism is referred to herein as an adaptive updater module, as discussed in FIGS. 5 and 8 below.

In various examples, in order to decide when to switch from BOT to 1TX-RMW, the adaptive updater module can monitor the rate of optimistic update failures. For example, the adaptive updater module can maintain the counts of successful optimistic updates and failed optimistic updates on a sliding window. In some examples, the sliding window may be 10 seconds or 1 minute in the past. In various examples, as soon as the failure rate increases above a certain threshold, Q1, the adaptive updater module can cause the updates to switch from BOT to 1TX-RMW.

In order to decide when to switch back from 1TX-RMW to BOT, adaptive updater module can use the same estimation of the failure rate, and as soon as the failure rate decreases below a certain threshold, Q2, switch from BOT to 1TX-RMW. In some examples, the second threshold Q2 may be lower than the first threshold Q1. In various examples, the values of Tr, Tw, Tfm, and Twb, can be estimated by monitoring the performance of the server against the database. In some examples, the adaptive updater module can estimate parameters E[k] (the average number of failures in a bulk) and Pr[K=0] (the probability of a successful bulk) in order to derive a selection criterion between regime BOT and 1TX-RMW.

While in the BOT update regime, the adaptive updater module can estimate these parameters, for example by observing the sample statistics of the last N bulks. However, while in the 1TX-RMW regime, there is only a sequence of single transactions. Therefore, in order to estimate parameters E[k] and Pr[K=0], the adaptive updater module can virtually divide the stream of single transactions into bulks of B transactions, and record for each virtual bulk the number of failures, k.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional clients, servers, databases, queries, etc.).

Figure 3:
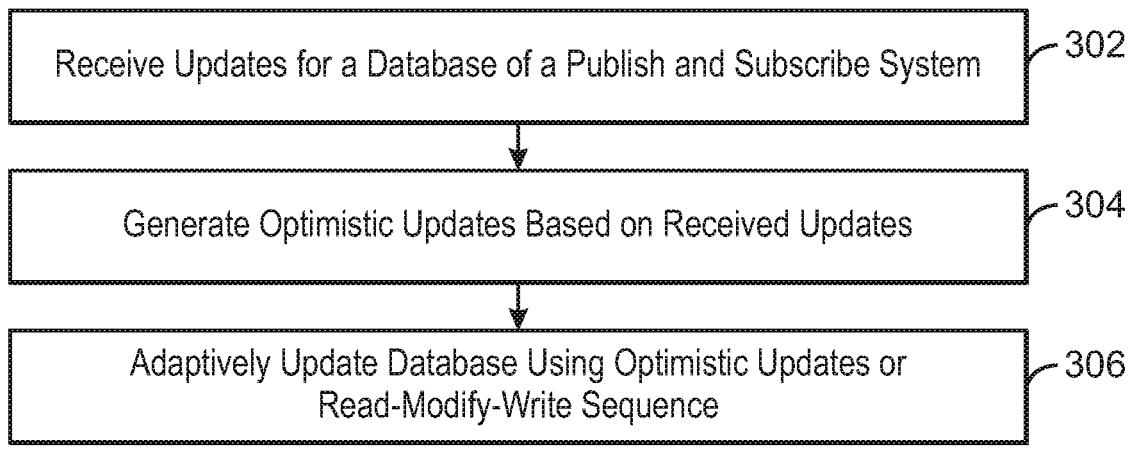
FIG. 3 is a block diagram of an example method that can adaptively update a database using optimistic updates.

FIG. 3 is a process flow diagram of an example method that can adaptively update a database using optimistic updates. The method 300 can be implemented with any suitable computing device, such as the computing device 500 of FIG. 5 or the systems 100 and 200 of FIGS. 1 and 2. In some examples, the methods described below can be implemented using the computer-readable media 800 of FIG. 8.

At block 302, a processor receives updates for a database of a publish and subscribe system. For example, the updates can include a connection status, a connecting server ID, and an update timestamp.

At block 304, the processor generates optimistic updates based on the received updates. The optimistic updates are updates that can be executed without individual read-modify-write operations. For example, optimistic updates are conditional updates that can be executed without a preceding read operation. In some examples, if a condition in the update is fulfilled, the update is executed. If not, the system must issue a corrective read-modify-write operation. Thus, if a condition is true most of the time (more than a certain threshold), and only rarely fails, optimistic transactions perform faster than read-modify-write, since they save a read most of the time, and rarely require the additional corrective read-modify-write. In some examples, the processor generates a bulk optimistic update based on the optimistic updates. The bulk optimistic update may be a number of optimistic updates to be executed at the same time.

At block 306, the processor adaptively updates the database using the optimistic updates or a read-modify-write sequence. In various examples, the processor updates the database using a bulk optimistic update. For example, the bulk optimistic update may be executed in parallel or serially. In some examples, the processor updates the database via the optimistic update or the bulk optimistic update using a find-and-modify operation. For example, the processor can look up a certain record, modifies some fields in the record, and returns the record either before or after the modification. In some examples, the processor updates the database using an individual read-modify-write operation in response to detecting an optimistic update failure rate exceeds a threshold rate. The database is updated to indicate connected or disconnected clients, and the client IDs of the connected and disconnected clients. The database may then be used to provide connection information in response to client connectivity queries.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 can include detecting that an optimistic update failure rate exceeds a threshold rate or does not exceed a threshold rate, as described in FIG. 4.

Figure 4:
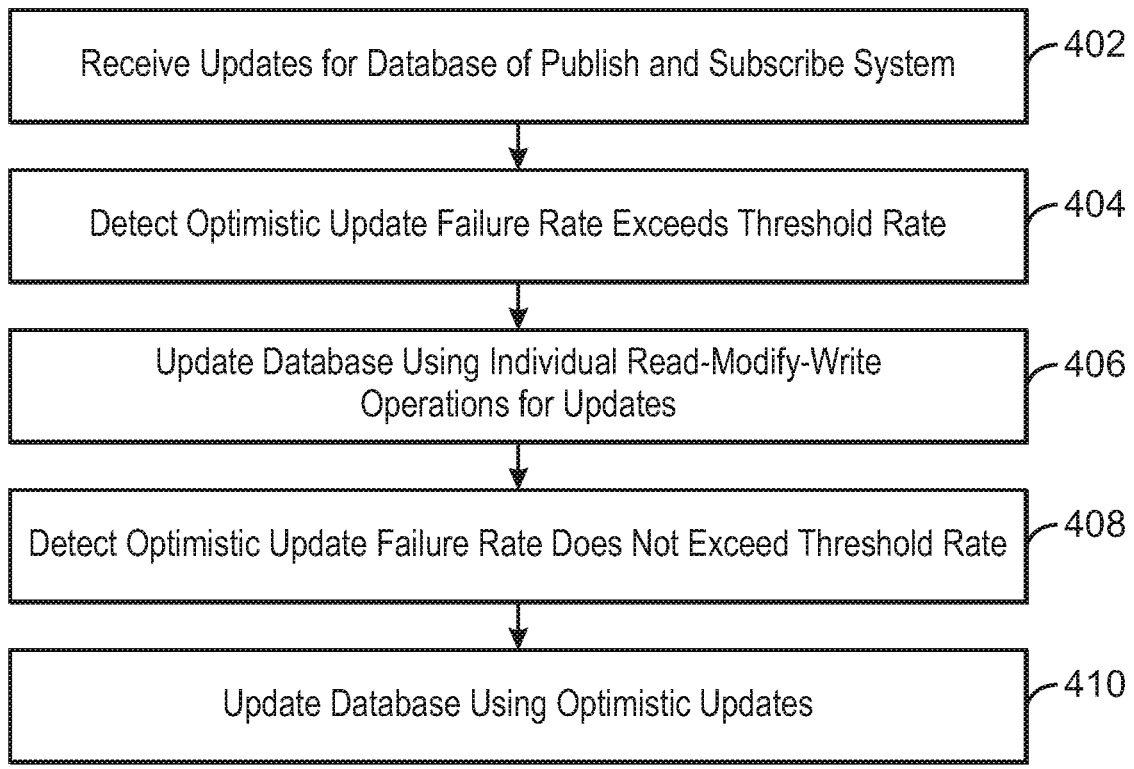
FIG. 4 is a block diagram of another example method that can adaptively update a database using optimistic updates.

FIG. 4 is a process flow diagram of another example method that can adaptively update a database using optimistic updates. The method 400 can be implemented with any suitable computing device, such as the computing device 500 of FIG. 5 or the systems 100 and 200 of FIGS. 1 and 2. In some examples, the methods described below can be implemented using the computer-readable media 800 of FIG. 8.

At block 402, a processor receives updates for a database of a publish and subscribe system. For example, the updates can include a connection status, a connecting server ID, and an update timestamp.

At block 404, the processor detects an optimistic update failure rate exceeds a threshold rate. For example, the processor can monitor a rate of optimistic update failures and estimate the optimistic update failure rate. In some examples, the processor can estimate the optimistic update failure rate based on a sliding window of a predetermined amount of time. For example, the sliding window can be a predetermined amount of time measured in seconds or minutes. In some examples, the processor can estimate the optimistic update failure rate based on a sliding window of a predetermined number of bulk updates or transactions. In various examples, when performing optimistic updates, the processor can estimate these parameters by observing the sample statistics of the last N bulks.

At block 406, the processor updates the database using individual read-modify-write operations. In some examples, individual read-modify-write operations are conditional and atomic. For example, the processor reads the row and records the LastUpdate field. The processor modifies the row-record in the server's memory based on the read content. The server then modifies the LastUpdate field to a newer timestamp. The processor updates the row in the table, conditioned that the current LastUpdate field is equal to the one obtained in the read step.

At block 408, the processor detects an optimistic update failure rate does not exceed a threshold rate. For example, the processor can estimate the optimistic failure rate while updating using individual read-modify-write operations by virtually dividing the stream of single transactions into bulks of a predetermined number of transactions, and recording for each virtual bulk the number of failures.

At block 410, the processor updates the database using the optimistic updates. For example, the processor updates the database using the bulk optimistic update in response to detecting that an optimistic update failure rate does not exceed a threshold rate.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
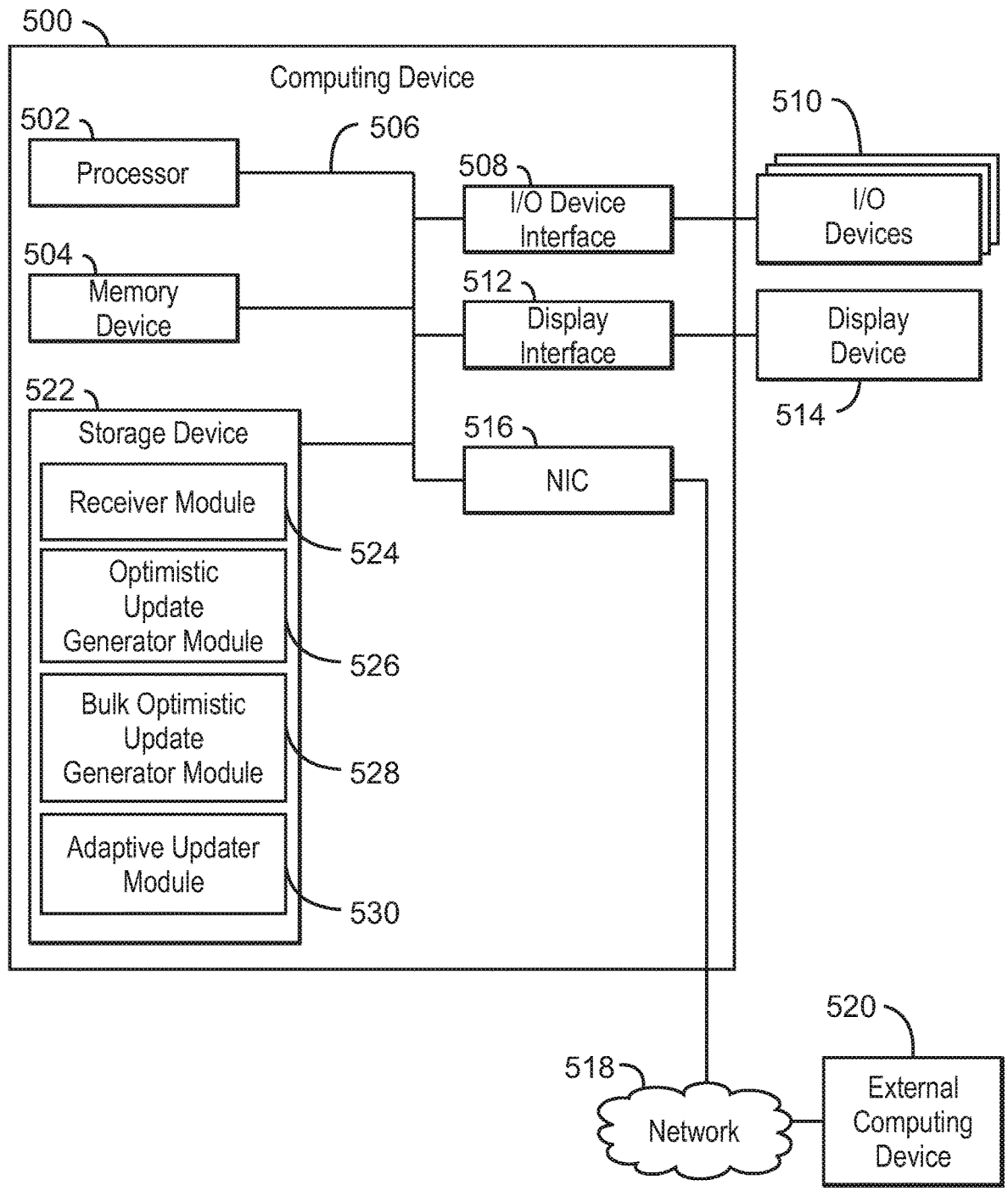
FIG. 5 is a block diagram of an example computing device that can adaptively update a database using optimistic updates.

FIG. 5 is block diagram of an example computing device that can adaptively update a database using optimistic updates. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, an optimistic update generator module 526, a bulk optimistic update generator module 528, and an adaptive updater module 530. The receiver module 524 can receive updates for a database of a publish and subscribe system. For example, the updates may include a connection status, a connecting server ID, and an update timestamp. The optimistic update generator module 526 can generate an optimistic update based on the received updates. The bulk optimistic update generator module 528 can generate bulk optimistic updates. The adaptive updater module 530 can adaptively update the database using the optimistic update or a read-modify-write sequence. In some examples, the adaptive updater module 530 adaptively updates the database using the bulk optimistic update in response to detecting that an optimistic update failure rate does not exceed a threshold rate. In various examples, the adaptive updater module 530 updates the database using an individual read-modify-write operation in response to detecting an optimistic update failure rate exceeds a threshold rate. In some examples, the adaptive updater module 530 can monitor a rate of optimistic update failures and estimate an optimistic update failure rate. In various examples, the adaptive updater module 530 can estimate the optimistic update failure rate based on a sliding window of a predetermined amount of time a predetermined number of bulk updates or transactions. In some examples, the adaptive updater module 530 can execute the optimistic update using a find-and-modify operation.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the receiver module 524, the optimistic update generator module 526, the bulk optimistic update generator module 528, and the adaptive updater module 530, may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, optimistic update generator module 526, bulk optimistic update generator module 528, and adaptive updater module 530, can be implemented with logic, wherein the logic, as referred to herein, can include any suitable hardware (e.g., a processor, among others), software (e.g., an application, among others), firmware, or any suitable combination of hardware, software, and firmware.

Figure 6:
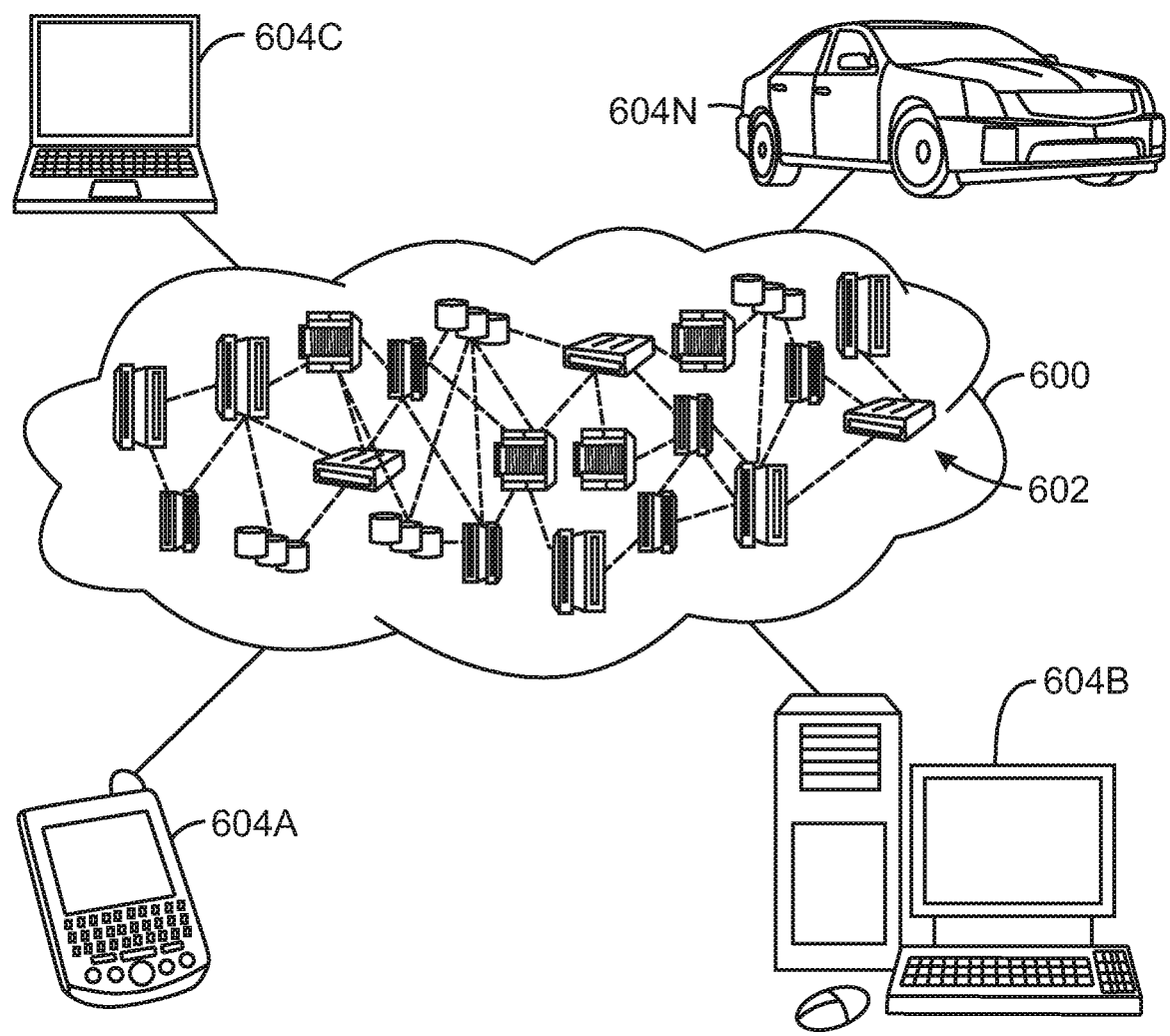
FIG. 6 is a process flow diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
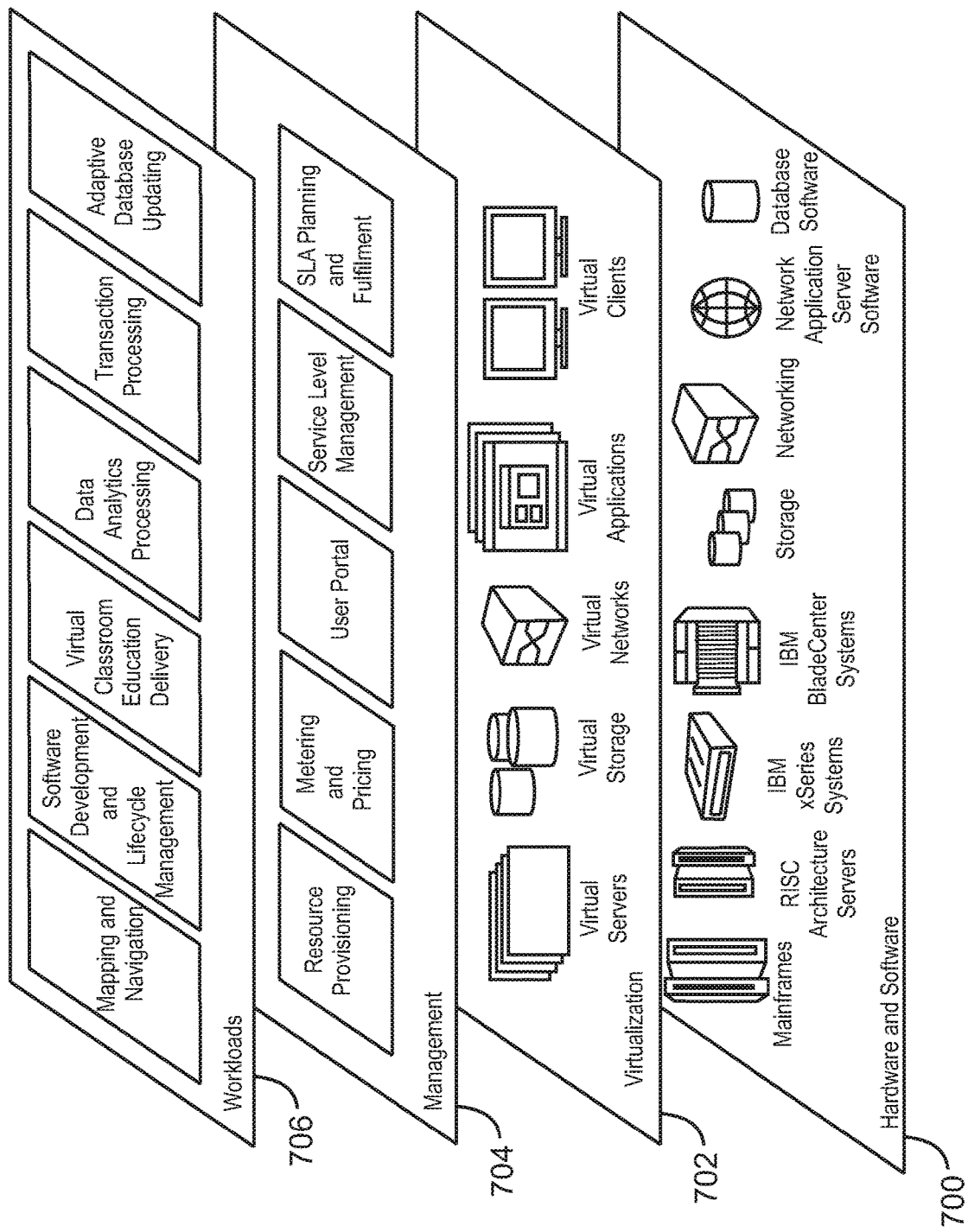
FIG. 7 is a process flow diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and adaptive database updating.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
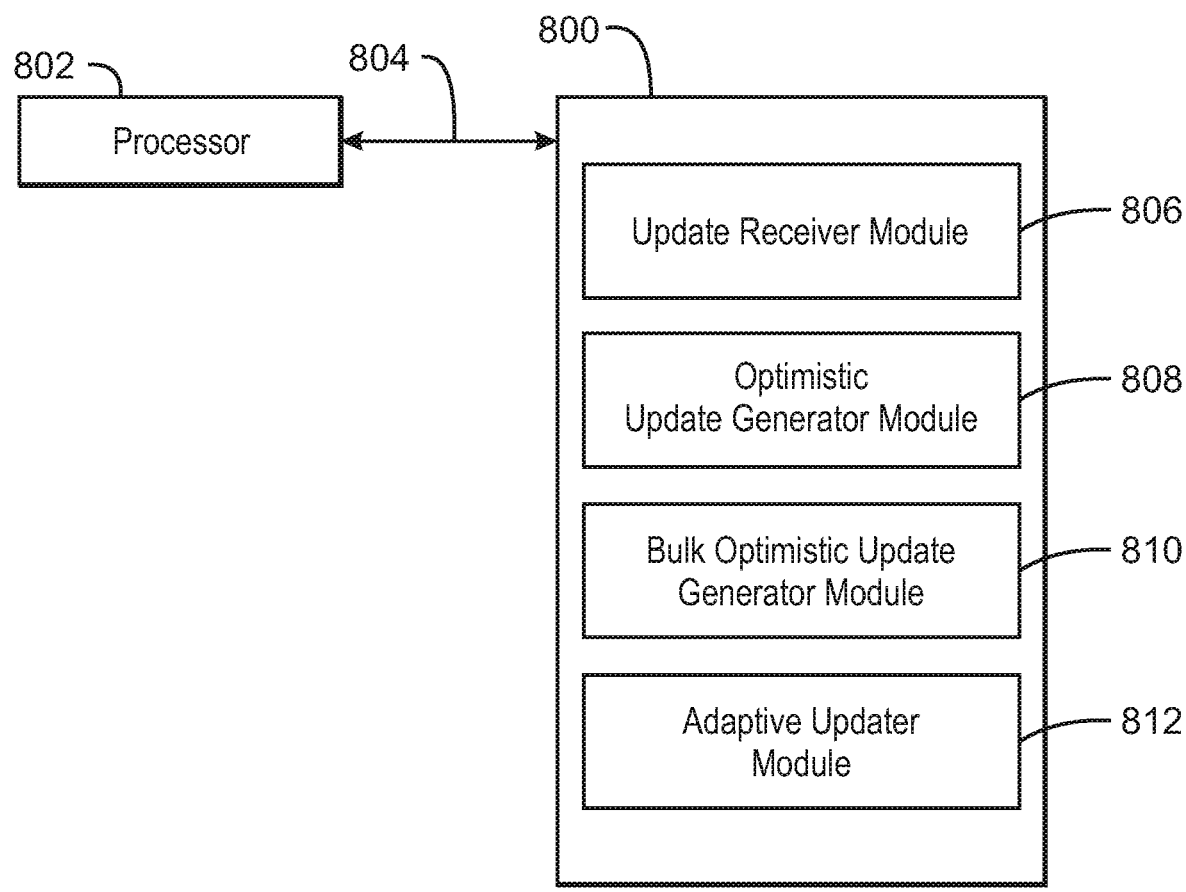
FIG. 8 is an example tangible, non-transitory computer-readable medium that can adaptively update a publish and subscribe system database using optimistic updates.

Referring now to FIG. 8, a block diagram is depicted of an example tangible, non-transitory computer-readable medium 800 that can adaptively update a publish and subscribe system database using optimistic updates. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 300 and 400 of FIGS. 3 and 4.

The various software components discussed herein may be stored on the tangible, non-transitory, computer-readable medium 800, as indicated in FIG. 8. For example, an update receiver module 806 includes code to receive updates for a database of a publish and subscribe system. An optimistic update generator module 808 includes code to generate an optimistic update based on the received updates. A bulk optimistic update generator module 810 includes code to generate a bulk optimistic update. An adaptive updater module 812 includes code to adaptively update the database using the optimistic update or a read-modify-write sequence. In some examples, the adaptive updater module 812 includes code to update the database using the bulk optimistic update in response to detecting that an optimistic update failure rate does not exceed a threshold rate. In various examples, the adaptive updater module 812 includes code to update the database using an individual read-modify-write operation in response to detecting an optimistic update failure rate exceeds a threshold rate. In some examples, the adaptive updater module 812 includes code to monitor a rate of optimistic update failures and estimate an optimistic update failure rate. For example, the adaptive updater module 812 includes code to estimate an optimistic update failure rate based on a sliding window of a predetermined amount of time a predetermined number of bulk updates or transactions. In some examples, the adaptive updater module 812 includes code to estimate an optimistic update failure rate by virtually dividing a stream of single transactions into virtual bulks of a predetermined number of transactions, and recording for each virtual bulk the number of failures. In some examples, the adaptive updater module 812 includes code to perform a find-and-modify operation to execute the bulk optimistic update. It is to be understood that any number of additional software components not shown in FIG. 8 may be included within the tangible, non-transitory, computer-readable medium 800, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for tracking client connectivity in publish and subscribe systems, comprising a processor to:
receive client status updates for a database coupled to a plurality of decoupled servers forming a distributed broker of a publish and subscribe system, wherein each of the decoupled servers sends an update to the database in response to a client connecting or disconnecting, and wherein the plurality of decoupled servers are decoupled with respect to each other;
generate an optimistic update based on the received client status updates, wherein each of the client status updates comprise connectivity information of a client that is to be routed to a server of the plurality of decoupled servers of the publish and subscribe system based on a load balancing scheme in response to a connection request from the client, wherein generating the optimistic update comprises reducing a read-modify-write sequence of a received client status update to a conditional update that uses a find-and-modify operation comprising selecting a record with a particular client ID and particular client status within a client status table of the database and updating the client status field to the particular client status and incrementing a last update field to a new value; and
adaptively update the database using the optimistic update based on an estimated optimistic update failure rate or the read-modify-write sequence based on the estimated optimistic update failure rate.

2. The system of claim 1, wherein the optimistic update comprises a bulk optimistic update.

3. The system of claim 2, wherein the processor is to update the database using the bulk optimistic update in response to detecting that the estimated optimistic update failure rate does not exceed a threshold rate.

4. The system of claim 1, wherein the processor is to update the database using an individual read-modify-write operation in response to detecting the estimated optimistic update failure rate exceeds a threshold rate.

5. The system of claim 1, wherein the processor is to monitor a rate of optimistic update failures and estimate the estimated optimistic update failure rate.

6. The system of claim 5, wherein the processor is to estimate the estimated optimistic update failure rate based on a sliding window of a predetermined amount of time.

7. The system of claim 5, wherein the processor is to execute the optimistic update using the find-and-modify operation.

8. A computer-implemented method, comprising:
receiving, via a processor, client status updates for a database coupled to a plurality of decoupled servers forming a distributed broker of a publish and subscribe system, wherein each of the client status updates comprise connectivity information of a client that is to be routed to a server of the plurality of decoupled servers of the publish and subscribe system based on a load balancing scheme in response to a connection request from the client, wherein each of the decoupled servers sends an update to the database in response to a client connecting or disconnecting, and wherein the plurality of decoupled servers are decoupled with respect to each other;
generating, via the processor, an optimistic update based on the received client status updates, wherein generating the optimistic update comprises reducing a read-modify-write sequence of a received client status update to a conditional update comprising a find-and-modify operation comprising selecting a record with a particular client ID and particular client status within a client status table of the database and updating the client status field to the particular client status and incrementing a last update field to a new value; and
adaptively updating, via the processor, the database using the optimistic update based on an estimated optimistic update failure rate or the read-modify-write sequence based on the estimated optimistic update failure rate.

9. The computer-implemented method of claim 8, wherein generating the optimistic update comprises generating a bulk optimistic update including the optimistic update.

10. The computer-implemented method of claim 9, comprising updating the database using the bulk optimistic update in response to detecting that the estimated optimistic update failure rate does not exceed a threshold rate.

11. The computer-implemented method of claim 8, comprising updating the database using an individual read-modify-write operation in response to detecting the estimated optimistic update failure rate exceeds a threshold rate.

12. The computer-implemented method of claim 8, comprising monitoring a rate of optimistic update failures and estimating the estimated optimistic update failure rate.

13. The computer-implemented method of claim 12, wherein estimating the estimated optimistic update failure rate is based a sliding window of a predetermined number of bulk updates or transactions.

14. The computer-implemented method of claim 8, wherein updating the database using the optimistic update comprises using the find-and-modify operation.

15. A computer program product for tracking client connectivity in publish and subscribe systems, the computer program product comprising a computer-readable storage medium having program code embodied therewith the program code executable by a processor to cause the processor to:
receive client status updates for a database coupled to a plurality of decoupled servers forming a distributed broker of a publish and subscribe system, wherein each of the client status updates comprise connectivity information of a client that is to be routed to a server of the plurality of decoupled servers of the publish and subscribe system based on a load balancing scheme in response to a connection request from the client, wherein each of the decoupled servers sends an update to the database in response to a client connecting or disconnecting, and wherein the plurality of decoupled servers are decoupled with respect to each other;

generate optimistic updates based on the received client status updates, wherein generating the optimistic updates comprises reducing a read-modify-write sequence of a received client status update to a conditional update comprising a find-and-modify operation comprising selecting a record with a particular client ID and particular client status within a client status table of the database and updating the client status field to the particular client status and incrementing a last update field to a new value;

generate a bulk optimistic update based on the optimistic updates; and adaptively update the database using the bulk optimistic update based on an estimated optimistic update failure rate or the read-modify-write sequence based on the estimated optimistic update failure rate, wherein the processor is to update the database using the bulk optimistic update in response to detecting that the estimated optimistic update failure rate does not exceed a first threshold rate.

16. The computer program product of claim 15, further comprising program code executable by the processor to update the database using an individual read-modify-write operation in response to detecting the estimated optimistic update failure rate exceeds a second threshold rate.

17. The computer program product of claim 15, further comprising program code executable by the processor to monitor a rate of optimistic update failures and estimate the estimated optimistic update failure rate.

18. The computer program product of claim 15, further comprising program code executable by the processor to estimate the estimated optimistic update failure rate based on a sliding window of a predetermined amount of time or a predetermined number of bulk updates or transactions.

19. The computer program product of claim 15, further comprising program code executable by the processor to estimate the estimated optimistic update failure rate by virtually dividing a stream of single transactions into virtual bulks of a predetermined number of transactions, and recording a number of failures for each virtual bulk.

20. The computer program product of claim 15, further comprising program code executable by the processor to perform the find-and-modify operation to execute the bulk optimistic update.

21. The system of claim 1, wherein the optimistic update is to be executed without an additional preceding read operation associated with the optimistic update.

* * * * *